United States Patent
Lin et al.

(10) Patent No.: US 8,294,646 B2
(45) Date of Patent: Oct. 23, 2012

(54) DISPLAY APPARATUS AND AUTOMATIC ADJUSTMENT METHOD THEREOF

(75) Inventors: Le Lin, Shenzhen (CN); Ming-Xiang Hu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 96 days.

(21) Appl. No.: 13/048,961

(22) Filed: Mar. 16, 2011

(65) Prior Publication Data

US 2012/0162166 A1 Jun. 28, 2012

(30) Foreign Application Priority Data

Dec. 23, 2010 (CN) .......................... 2010 1 0602349

(51) Int. Cl.
G09G 3/36 (2006.01)
(52) U.S. Cl. ......................................... 345/87; 345/207
(58) Field of Classification Search .................. 345/63, 345/77, 87, 89, 84, 90, 204, 207
See application file for complete search history.

(56) References Cited

U.S. PATENT DOCUMENTS

| | | | |
|---|---|---|---|
| 2006/0187441 A1* | 8/2006 | Sugiyama et al. | 356/3.05 |
| 2007/0013877 A1* | 1/2007 | Tantasirikorn | 353/77 |
| 2007/0109239 A1* | 5/2007 | den Boer et al. | 345/87 |
| 2008/0084374 A1* | 4/2008 | Abileah et al. | 345/87 |
| 2009/0225411 A1* | 9/2009 | Cui et al. | 359/385 |
| 2010/0013793 A1* | 1/2010 | Abileah et al. | 345/174 |
| 2010/0020044 A1* | 1/2010 | Abileah et al. | 345/175 |
| 2011/0063214 A1* | 3/2011 | Knapp | 345/158 |

* cited by examiner

*Primary Examiner* — Ricardo L Osorio
(74) *Attorney, Agent, or Firm* — Altis Law Group, Inc.

(57) ABSTRACT

A display apparatus includes a photoelectric sensor disposed on an inner side of a frame and located corresponding to a corner of a pixel area of a display panel in a predetermined position. When the display apparatus is turned on, the display panel provides a light spot at a corner of a current pixel area of the display apparatus corresponding to the photoelectric sensor, and a micro-control circuit compares an electronic signal received from the photoelectric sensor with a sample value. If different, an interrupt is triggered to execute a position offsetting interrupt program to adjust the display parameter of the display apparatus, thereby moving the pixel area to adjust the relative position of the light spot and the photoelectric sensor, so that the relative position becomes identical to that when the pixel area of the display panel is in the predetermined position.

7 Claims, 4 Drawing Sheets

DISPLAY APPARATUS AND AUTOMATIC ADJUSTMENT METHOD THEREOF

BACKGROUND

1. Technical Field

The present disclosure relates to a display apparatus and an automatic adjustment method thereof.

2. Description of Related Art

In almost all computer systems, a display is a critical component. However, when using a monitor as a display, dislocation of the display area of a display panel can hinder the display of images. Adjustment of the display area is often executed by an automatic adjustment control. Even so, manual fine tuning adjustment(s) may still need to be implemented. Therefore there is room for improvement in the art.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
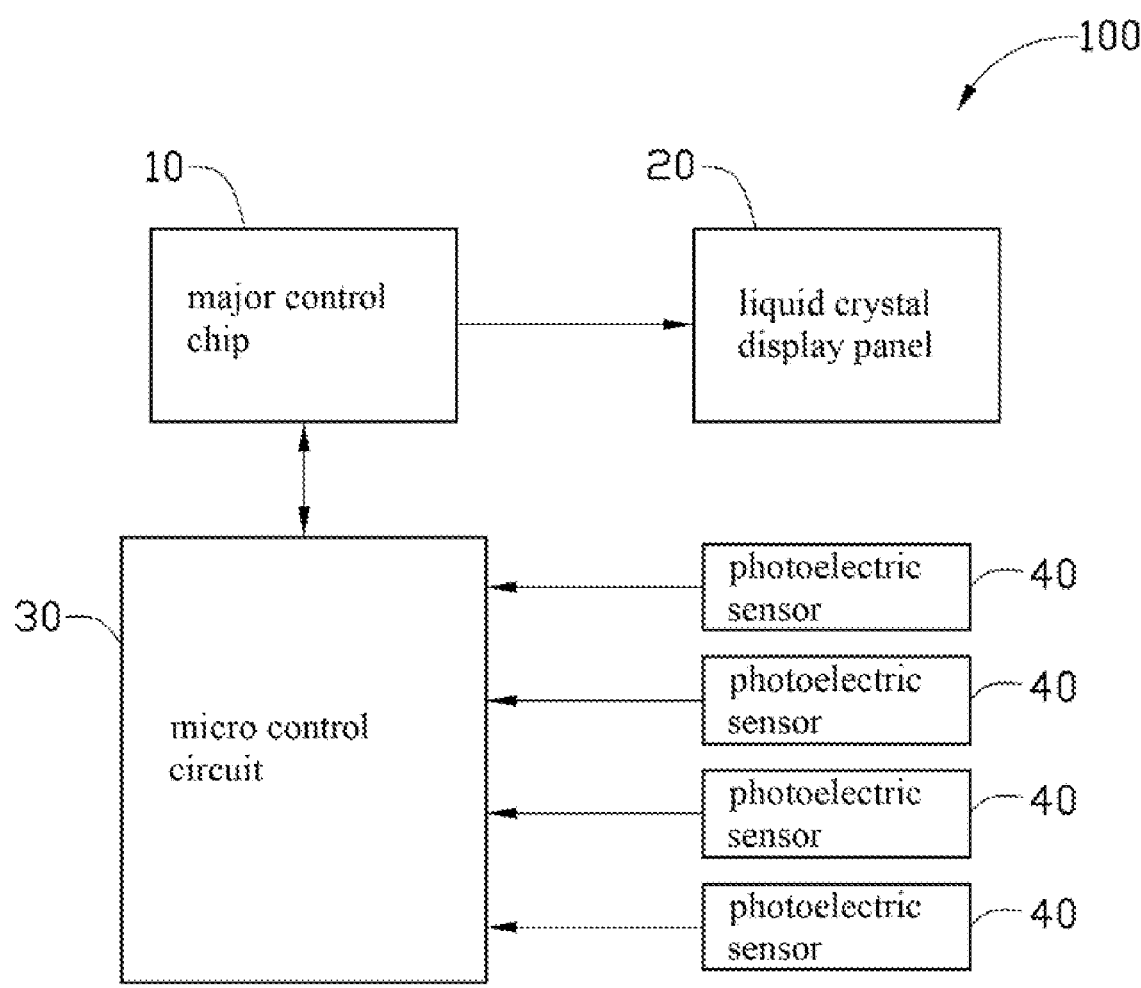
FIG. 1 is a block diagram of a preferred embodiment of a display apparatus of the present disclosure.
Figure 2:
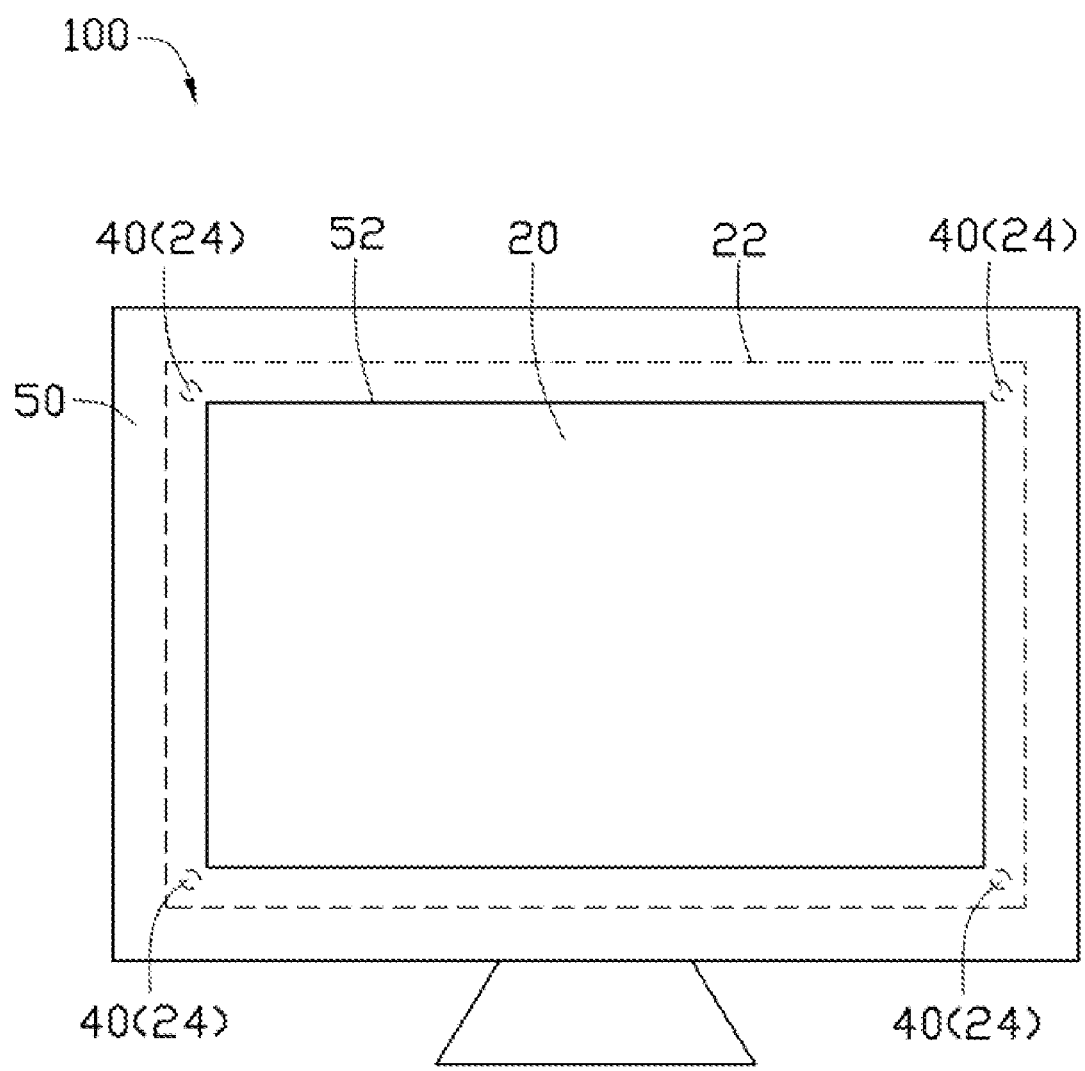
FIG. 2 is a schematic diagram of a preferred embodiment of a display apparatus of the present disclosure with the pixel area locating in a predetermined position.
Figure 3:
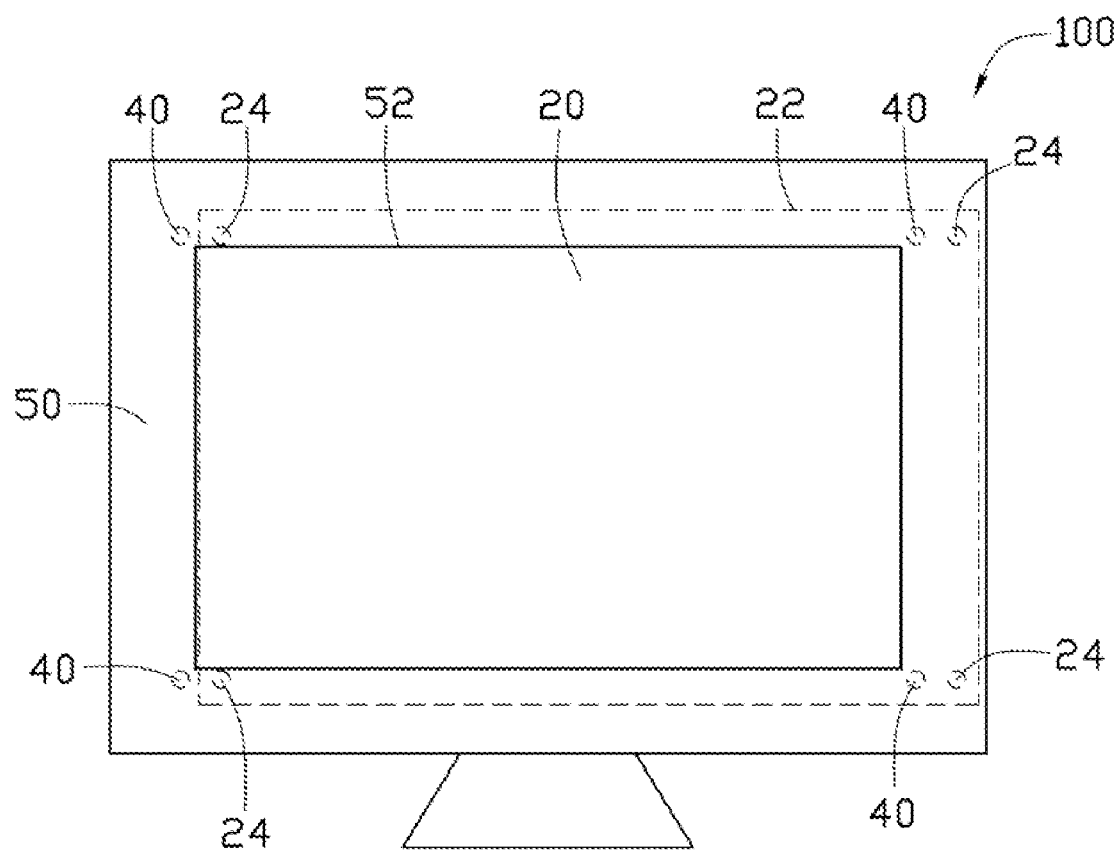
FIG. 3 is a schematic diagram of a preferred embodiment of a display apparatus of the present disclosure with the pixel area not locating in a predetermined position.

As shown in FIG. 1 to FIG. 3, a preferred embodiment of the display apparatus 100 of the present disclosure includes a frame 50, a display panel such as a liquid crystal display panel 20 disposed in the frame 50, a control chip 10 disposed in the frame 50, and a micro-control circuit 30 processing received data and outputting the data to the liquid crystal display panel 20 through the control chip 10.

The preferred embodiment of the display apparatus 100 further includes four photoelectric sensors 40 connected to the micro-control circuit 30. As shown in FIG. 2, a pixel area 22 of the liquid crystal display panel 20 where the pixels of the liquid crystal display panel 20 are located at exceeds the area enclosed by the inner edge 52 of the frame 50. The pixel area 22 covers the area enclosed by the inner edge 52 when in a predetermined position. The four photoelectric sensors 40 are disposed on the inner side of the frame 50 and located corresponding to four corners of the pixel area 22 in a predetermined position. When the display apparatus 100 is turned on, the micro-control circuit 30 sends an instruction to the control chip 10, directing the display panel 20 to continuously provide four light spots 24 at the four corners of the pixel area 22 of the display panel 20, respectively, so that the four light spots 24 respectively overlap the four photoelectric sensors 40 when the pixel area 22 is in the predetermined position (in other embodiments, the light spot 24 can partially overlap the photoelectric sensor 40). Since the pixel area 22 exceeds the area enclosed by the inner edge 52 of the frame 50, the four light spots 24 and the four photoelectric sensors 40 are covered by the frame 50 when the pixel area 22 is in the predetermined position. In addition, when the pixel area 22 is in the predetermined position, the four photoelectric sensors 40 respectively detect the light signals submitted by the four light spots 24, transforming the light signals to corresponding electronic signals, and submitting the electronic signals to the micro-control circuit 30. An inner memory of the micro-control circuit 30 stores a sample value corresponding to an electronic signal received from the photoelectric sensor 40 when the pixel area 22 is in the predetermined position. The disclosed process can be performed in tests before production of the display apparatus 100.

If the pixel area 22 is not in a predetermined position, such as the pixel area 22 shown in FIG. 3, it has a rightward dislocation of a certain distance, and the light spots 24 on the four corners of the pixel area 22 correspondingly move rightward a certain distance, such that the four light spots 24 do not overlap the four photoelectric sensors 40. The micro-control circuit 30 compares the electronic signals received from the photoelectric sensors 40 with the sample value. If different, an interrupt is triggered to execute a position offsetting interrupt program in the micro-control circuit to adjust the display parameter of the display apparatus 100, thereby moving the pixel area 22 so that the four light spots 24 overlap the four photoelectric sensors 40 (if the light spots 24 not overlap the four photoelectric sensors 40 when the pixel area 22 is in the predetermined position, the light spots 24 are moved so that the position of the four light spots 24 with respect to the photoelectric sensor 40 are identical to that when the pixel area 22 of the display panel 20 is in the predetermined position.). The position offsetting interrupt program is a program executed by an automatic adjustment control. In other embodiments, merely disposing one photoelectric sensor 40 on one corner of the pixel area 22 is acceptable. Correspondingly, when the display apparatus 100 is turned on, only the light spot 24 corresponding to the photoelectric sensor 40 is provided, and the relative position of the photoelectric sensor 40 and the light spot 24 is compared. In this embodiment, the four photoelectric sensors 40 and the four light spots 24 are utilized to provide an enhanced accuracy in the adjustment of the parameters, while their number can be changed according to actual demands.

Figure 4:
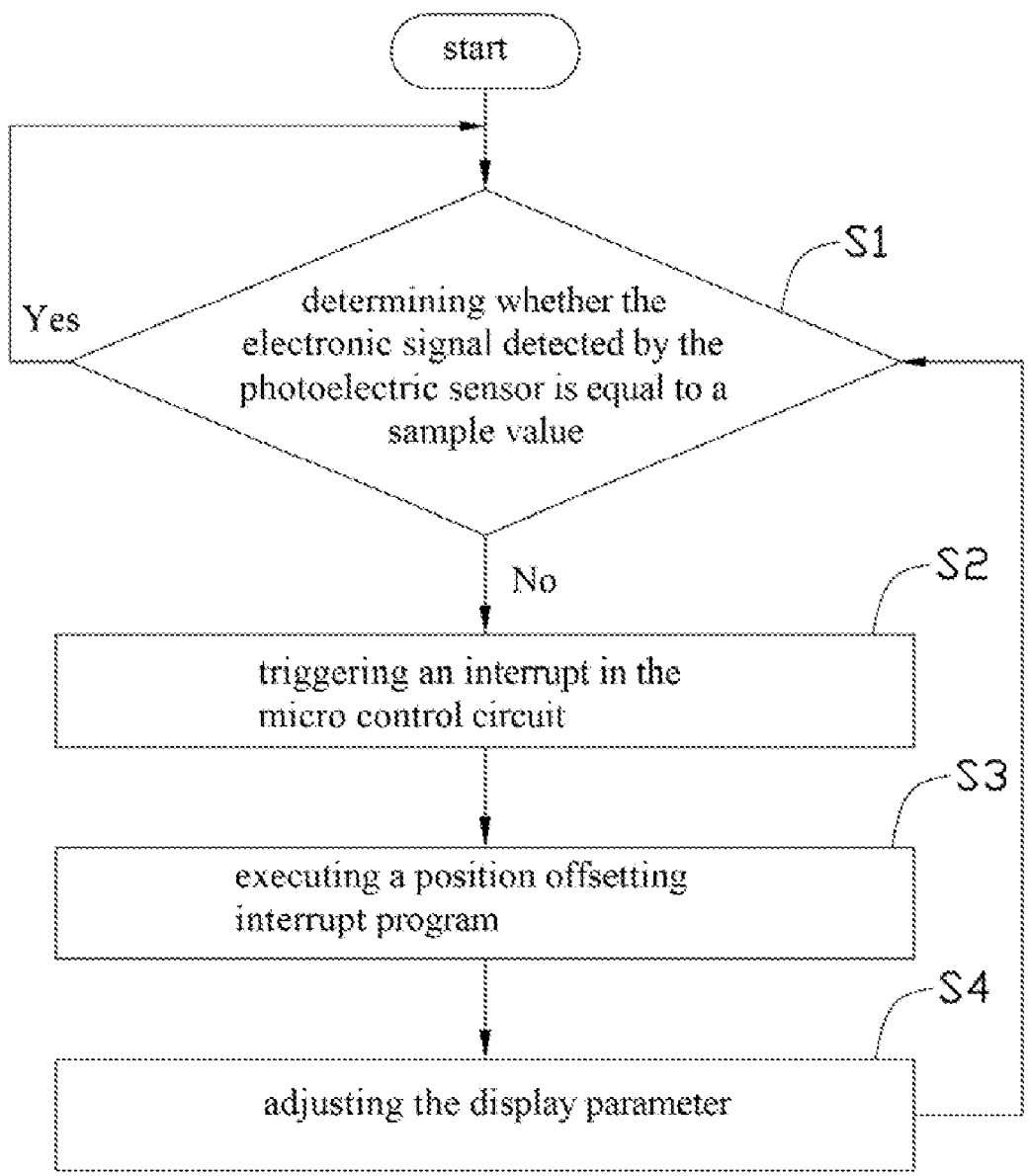
FIG. 4 is a flowchart of a preferred embodiment of an automatic adjustment method of a display apparatus.

As shown in FIG. 4, a preferred embodiment of an automatic adjustment method for the display apparatus 100 as disclosed is as follows. Depending on the embodiment, additional steps may be added, others removed, and the ordering of the steps may be changed.

In step S1, the micro-control circuit 30 receives electronic signals from the four photoelectric sensors 40 for comparison with a sample value. If the same, the electronic signals from the four photoelectric sensors 40 are continuously received for comparison with the sample value; if different, step S2 is implemented.

In step S2, the micro-control circuit 30 triggers an interrupt.

In step S3, the micro-control circuit 30 executes a position offsetting interrupt program according to the interrupt.

In step S4, the micro-control circuit 30 adjusts the display parameter of the display apparatus 100 through the position offsetting interrupt program, thereby utilizing the control chip 10 to move the pixel area 22 so that the four light spots 24 overlap the four photoelectric sensors 40, and step S1 is repeated.

The display apparatus 100 of the present disclosure utilizes the disclosed automatic adjustment method to locate the pixel area 22 of the liquid crystal display panel 20 at the predetermined position in an automatic manner, instead of manually activating an automatic adjustment control of a display apparatus. The disclosed method enhances the convenience of using the display apparatus 100.

While the disclosure has been described by way of example and in terms of preferred embodiment, it is to be understood that the disclosure is not limited thereto. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A display apparatus comprising:
a frame including an inner edge and an inner side;
a display panel including a pixel area exceeding the area enclosed by the inner edge of the frame, wherein the pixel area covers the area enclosed by the inner edge when the pixel area is in a predetermined position;
a control chip;
a photoelectric sensor disposed on the inner side of the frame and located corresponding to a corner of the pixel area in the predetermined position; and
a micro-control circuit including a position offsetting interrupt program and an inner memory, wherein the photoelectric sensor is connected to the micro-control circuit, the inner memory of the micro-control circuit stores a sample value corresponding to an electronic signal received from the photoelectric sensor when the pixel area is in the predetermined position, when the display apparatus is turned on, the micro-control circuit sends an instruction to the control chip, directing the display panel to continuously provide a light spot at a corner of the pixel area of the display apparatus corresponding to the photoelectric sensor;
wherein whenever the display apparatus is turned on, the micro-control circuit compares an electronic signal received from the photoelectric sensor with the sample value, if different, an interrupt is triggered to execute the position offsetting interrupt program of the micro-control circuit to adjust the display parameter of the display apparatus, thereby moving the pixel area to adjust the relative position of the light spot and the photoelectric sensor, so that the relative position becomes identical to the relative position of the light spot and the photoelectric sensor when the pixel area of the display panel is in the predetermined position.

2. The display apparatus of claim 1, further comprising three photoelectric sensors disposed on the inner side of the frame and respectively located corresponding to three other corners of the pixel area in the predetermined position, when the display apparatus is turned on, the micro-control circuit sends an instruction to the control chip, directing the display panel to continuously provide three light spots at the three corners of the pixel area of the display apparatus corresponding to the three photoelectric sensor, respectively, the inner memory of the micro-control circuit stores sample values corresponding to the electronic signals received from the photoelectric sensor when the pixel area is in the predetermined position, wherein whenever the display apparatus is turned on, the micro-control circuit compares the electronic signals received from the three photoelectric sensor with the sample values, respectively, if different, an interrupt is triggered to execute the position offsetting interrupt program of the micro-control circuit to adjust the display parameter of the display apparatus, thereby moving the pixel area to adjust the relative positions of the light spots and the corresponding photoelectric sensors, so that the relative positions become identical to the relative positions of the light spots and the corresponding photoelectric sensors when the pixel area of the display panel is in the predetermined position.

3. The display apparatus of claim 1, wherein the display panel is a liquid crystal display.

4. The display apparatus of claim 1, wherein the light spot at the corner of the pixel area overlaps the photoelectric sensor when the pixel area is in the predetermined position.

5. A automatic adjustment method for a display apparatus, the display apparatus including a frame, a display panel, a control chip, a micro-control circuit, a photoelectric sensor connected to the micro-control circuit, the photoelectric sensor is disposed on an inner side of the frame and located corresponding to a corner of the pixel area in the predetermined position, when the display apparatus is turned on, the micro-control circuit sends an instruction to the control chip, directing the display panel to continuously provide a light spot at a corner of the pixel area of the display apparatus corresponding to the photoelectric sensor, an inner memory of the micro-control circuit stores a sample value corresponding to an electronic signal received from the photoelectric sensor when the pixel area is in the predetermined position, the automatic adjustment method comprising:
a) receiving electronic signals from the photoelectric sensor for comparison with the sample value, if different, performing step b;
b) triggering an interrupt in the micro-control circuit;
c) executing a position offsetting interrupt program according to the interrupt; and
d) adjusting the display parameter of the display apparatus through the position offsetting interrupt program, thereby utilizing the control chip to move the pixel area to adjust the relative position of the light spot and the photoelectric sensor, so that the relative position becomes identical to the relative position of the light spot and the photoelectric sensor when the pixel area of the display panel is in the predetermined position, then returning to step a.

6. The automatic adjustment method of claim 5, wherein the display panel is a liquid crystal display.

7. The automatic adjustment method of claim 5, wherein the light spot at the corner of the pixel area overlaps the photoelectric sensor when the pixel area is in the predetermined position.

* * * * *